March 25, 1930. O. W. JOHNSON 1,751,638
STRAINER NOZZLE
Filed Sept. 28, 1927
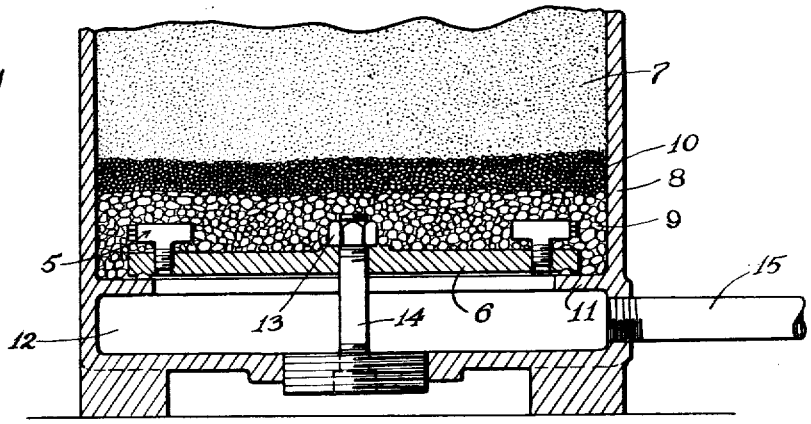
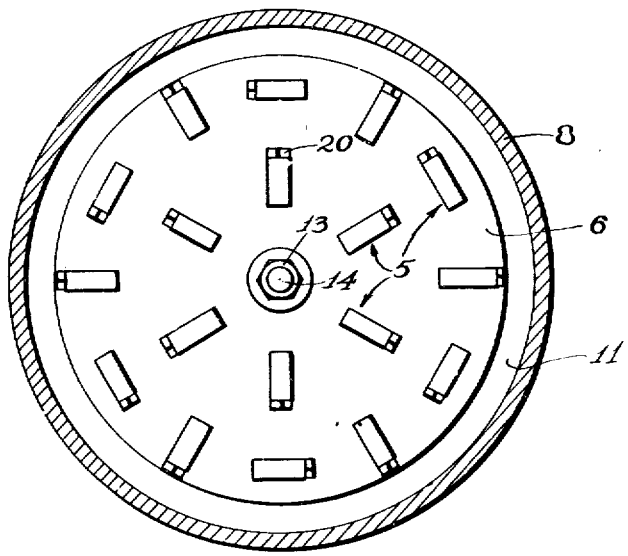
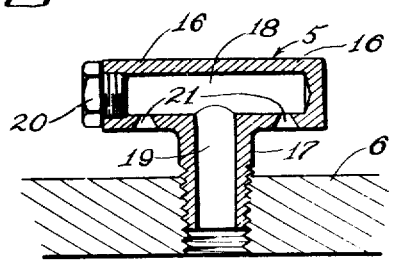
INVENTOR
Oscar W. Johnson
BY
Wilson & McCann
ATTY'S Patented Mar. 25, 1930

1,751,638

UNITED STATES PATENT OFFICE

OSCAR W. JOHNSON, OF ROCKFORD, ILLINOIS, ASSIGNOR TO WARD-LOVE PUMP CORPORATION, OF ROCKFORD, ILLINOIS, A CORPORATION OF ILLINOIS

STRAINER NOZZLE

Application filed September 28, 1927. Serial No. 222,554.

This invention relates to water softeners and allied devices and is more particularly concerned with a novel type of strainer nozzle, so designed and constructed as to be practically non-clogging while serving to give substantially uniform distribution of the water or other fluid throughout the cross-sectional area of the bed under which the nozzles are used.

The strainer nozzles of my invention, as herein disclosed, are suitably in the form of hollow T-fittings having downwardly directed openings in the branches thereof in laterally offset relation to the trunk portions, the said openings being flared outwardly and serving thereby not only to cause a fanning or spreading out of the water discharged from the nozzles so as to aid uniform distribution thereof as referred to, but also tend to result in the easy dislodgment of any solid particles which may have embedded themselves in the openings during a reverse flow through the nozzles.

The invention is illustrated in the accompanying drawing wherein—

Figure 1 is a section through the base portion of a water softener tank showing the use of my improved strainer nozzles on a distributer plate beneath the bed of water softening material, Fig. 2 is a horizontal section showing the distributer plate in plan to disclose the number and arrangement of the nozzles employed; and, Fig. 3 is an enlarged vertical section through one of the nozzles.

The strainer nozzles of my invention, indicated generally by the reference numeral 5, are shown in Figs. 1 and 2 as mounted on a distributer plate 6 beneath a bed 7 of zeolite, or other base-exchange water softening material, in the softener tank 8, although of course so far as the characteristics of the nozzles of my invention are concerned the same might be employed in filters or any other allied devices. When employed in a water softener a layer 9 of gravel or other coarse material is preferably employed between the nozzles and the water softening material, the latter being of a much finer texture. Furthermore, a layer 10 of quartz of medium coarseness is usually provided between the gravel and the water softening material. The distributer plate supports all of the material referred to and rests on top of a rim 11 suitably cast integral with the walls of the tank and serving to define the top of a sediment chamber 12. The distributer plate is suitably clamped in place on the rim 11 by the tightening of a nut 13 on a central stud 14, a gasket being employed between the plate 6 and the rim 11, as shown, to insure a water-tight joint. A pipe 15 communicates with the chamber 12 and serves normally as the inlet pipe for the introduction of hard water for discharge through the nozzles and passage upwardly through the bed of water softening material for softening. The nozzles 5 are arranged in substantially uniformly spaced relation and crisscrossed with respect to one another as disclosed in Fig. 2, with a view to distributing the water flow as uniformly as possible throughout the cross-sectional area of the bed, the nozzles being furthermore so constructed, as hereinafter described, that the water discharged therefrom is fanned or spread out in all directions from the individual nozzles so that the uniform distribution of the water flow throughout the cross-sectional area of the bed is still further insured. In water softeners operating on the up-flow principle, as just indicated, the regeneration of the bed of water softening material is ordinarily carried out by a reverse flow of salt brine downwardly through the bed, the lime and magnesium hardness assimilated by the material being freed and washed out to a certain extent during the salt wash. Following the salt wash there is ordinarily a rinse in the same direction or in the reverse direction to the salt wash to insure the complete flushing out of any brine or liberated lime from the bed before the normal flow for softening is resumed. During the reverse flow in the salt wash, or possibly in the salt wash and rinse, there is considerable likelihood of particles of gravel or quartz, or even mineral, becoming embedded in the nozzles openings. It is, therefore, a still further object of my invention, as hereinafter described, to so construct the nozzles that the particles tend to become dislodged in the normal flow of the water therethrough.

The nozzles 5, as clearly appears in Fig. 3, are in the form of T-fittings, although of course a single branched fitting or a fitting having any other number of branches might be employed. The branches designated at 16 extend laterally from the trunk or body portion 17 and have a cross passage 18 drilled therein from one end of one of the branches and communicating intermediate its ends with the passage 19 in the trunk portion 17. A plug 20 threading into place serves to close the open end of the passage 18 and affords access to the inside of the fitting if this is ever desired, as for example, in cleaning the same. Downwardly directed openings 21 are provided in the branches 16 in laterally offset relation to the trunk portion 17, and are flared outwardly, that is, downwardly, to accomplish a double purpose, namely that of fanning or spreading out the water discharged therefrom in the normal operation of the nozzles to secure uniform distribution of the water throughout the cross-sectional area of the bed, and also to result in the easy dislodgment of any particles which may have become embedded therein during a reverse flow through the nozzles. The uniform distribution, while responsible to a large degree to the outward flaring of the openings 21, is also due to the fact that the water jets issuing from the said openings strike the distributer plate and are thereby spread out substantially evenly in all directions.

I claim:

1. In a water softener having a distributer plate beneath a bed of water softening material provided with a plurality of openings in substantially uniformly spaced relation, a strainer nozzle for each of said openings comprising a hollow vertical trunk portion mounted in the opening and having one or more hollow branches extending laterally therefrom, the said branches being provided with downwardly directed, outwardly flared, openings therein laterally offset from the trunk portion substantially as and for the purpose described, these nozzles being adapted to be mounted in a series in spaced relation on the bottom, or the equivalent, of a water softener beneath the bed of water softening material and to serve primarily as outlets for the incoming hard water but being arranged to have the direction of flow reversed therethrough.

2. In a water softener having a distributer plate beneath a bed of water softening material provided with a plurality of openings in substantially uniformly spaced relation, a strainer nozzle for each of said openings comprising a hollow T-fitting having the vertical trunk portion thereof mounted in the opening and having the laterally directed hollow branches thereof extending therefrom in opposite directions and provided with downwardly directed, outwardly flared, openings in laterally offset relation to the trunk portion substantially as and for the purpose described, these nozzles being adapted to be mounted in a series in spaced relation on the bottom, or the equivalent, of a water softener beneath the bed of water softening material and to serve primarily as outlets for the incoming hard water but being arranged to have the direction of flow reversed therethrough.

3. A strainer nozzle for the purpose described, comprising a hollow T-fitting having the horizontal portion drilled from one end thereof and communicating with a bore provided in the vertical trunk portion, there being a removable closure for the opening in the end of said horizontal portion, and the latter being provided with downwardly directed openings in laterally offset relation to the trunk for the purpose described.

4. A strainer nozzle for the purpose described, comprising a T-fitting having a vertical trunk portion integral with a cross portion and provided with a bore reaching from the open lower end thereof and communicating at its upper end with a transverse bore provided in the cross portion, the latter being provided with downwardly directed openings in laterally offset relation to the trunk portion for the purpose described.

5. A strainer nozzle for the purpose described, comprising a T-fitting having a vertical trunk portion integral with a cross portion and provided with a bore reaching from the open lower end thereof and communicating at its upper end with a transverse bore provided in the cross portion, the latter being provided with downwardly directed outwardly flared openings in laterally offset relation to the trunk portion for the purpose described.

6. A strainer nozzle for the purpose described, comprising a fitting having a vertical trunk portion integral with one or more laterally directed branch portions and provided with a bore reaching from the open lower end thereof and communicating at its upper end with transverse bores provided in the branch portions, the latter being provided with downwardly directed openings in laterally offset relation to the trunk portion for the purpose described.

7. A strainer nozzle for the purpose described, comprising a fitting having a vertical trunk portion integral with one or more laterally directed branch portions and provided with a bore reaching from the open lower end thereof and communicating at its upper end with transverse bores provided in the branch portions, the latter being provided with downwardly directed outwardly flared openings in laterally offset relation to the trunk portion for the purpose described.

In witness of the foregoing I affix my signature.

OSCAR W. JOHNSON.

CERTIFICATE OF CORRECTION.

Patent No. 1,751,638.   Granted March 25, 1930, to

OSCAR W. JOHNSON.

It is hereby certified that error appears in the printed specification of the above numbered patent requiring correction as follows: Page 2, lines 61 to 68, claim 1, and lines 82 to 89, claim 2, after the word "described" for the comma read a period and strike out the words "these nozzles being adapted to be mounted in a series in spaced relation on the bottom, or the equivalent, of a water softener beneath the bed of water softening material and to serve primarily as outlets for the incoming hard water but being arranged to have the direction of flow reversed therethrough."; and that the said Letters Patent should be read with these corrections therein that the same may conform to the record of the case in the Patent Office.

Signed and sealed this 22nd day of April, A. D. 1930.

(Seal)

M. J. Moore,
Acting Commissioner of Patents.

erally offset relation to the trunk portion for the purpose described.

7. A strainer nozzle for the purpose described, comprising a fitting having a vertical trunk portion integral with one or more laterally directed branch portions and provided with a bore reaching from the open lower end thereof and communicating at its upper end with transverse bores provided in the branch portions, the latter being provided with downwardly directed outwardly flared openings in laterally offset relation to the trunk portion for the purpose described.

In witness of the foregoing I affix my signature.

OSCAR W. JOHNSON.

CERTIFICATE OF CORRECTION.

Patent No. 1,751,638.                    Granted March 25, 1930, to

OSCAR W. JOHNSON.

It is hereby certified that error appears in the printed specification of the above numbered patent requiring correction as follows: Page 2, lines 61 to 68, claim 1, and lines 82 to 89, claim 2, after the word "described" for the comma read a period and strike out the words "these nozzles being adapted to be mounted in a series in spaced relation on the bottom, or the equivalent, of a water softener beneath the bed of water softening material and to serve primarily as outlets for the incoming hard water but being arranged to have the direction of flow reversed therethrough."; and that the said Letters Patent should be read with these corrections therein that the same may conform to the record of the case in the Patent Office.

Signed and sealed this 22nd day of April, A. D. 1930.

(Seal)

M. J. Moore,
Acting Commissioner of Patents.